Oct. 22, 1940.  D. E. NORGAARD  2,219,195
ELECTRONIC VOLTAGE REGULATOR
Filed March 29, 1939
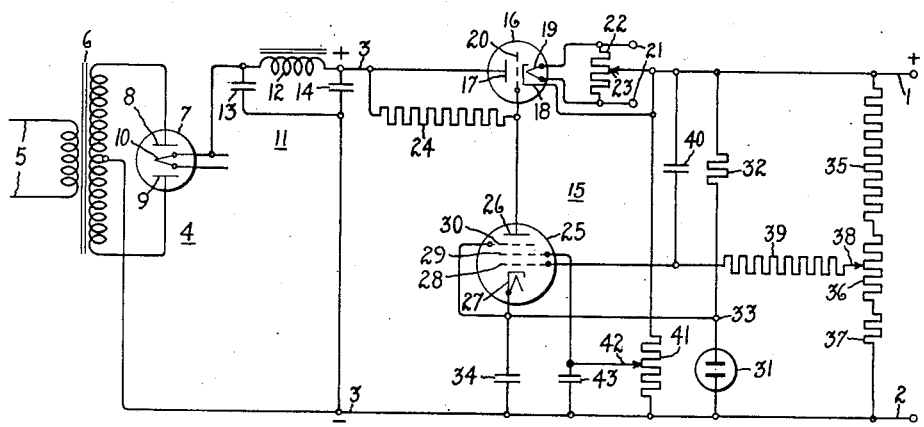
Inventor:
Donald E. Norgaard,
by Harry E. Dunham
His Attorney.

Patented Oct. 22, 1940

2,219,195

UNITED STATES PATENT OFFICE 2,219,195

ELECTRONIC VOLTAGE REGULATOR

Donald E. Norgaard, Schenectady, N. Y., assignor to General Electric Company, a corporation of New York Application March 29, 1939, Serial No. 264,751

10 Claims. (Cl. 171—312)

My invention relates to electric regulating circuits and more particularly to electronic voltage regulators.

It is frequently desirable to control the voltage of a direct current circuit within very narrowly defined limits. For example, in many applications, such as television, wireless and the like, it is important to maintain a direct current voltage at a precisely determinable value and to maintain the voltage substantially constant within wide ranges of load current. Where a source of unidirectional voltage is obtained by means of a rectifier energized from an alternating current circuit, it is desirable to employ an electronic voltage regulator between the output circuit of the rectifier and the load circuit to maintain the voltage of the load circuit substantially constant. As is well understood, as the load current varies, the variations in voltage drop due to the impedance of the rectifier cause a substantial variation in the value of the voltage transmitted to the load circuit. In accordance with the teachings of my invention described hereinafter, I provide a new and improved electronic voltage regulator which is simple in construction and arrangement and which maintains the load voltage within narrowly defined limits.

It is an object of my invention to provide a new and improved electronic voltage regulator.

It is another object of my invention to provide a new and improved electronic voltage regulator for controlling the output voltage of an electric valve rectifier.

It is a further object of my invention to provide a new and improved electronic voltage regulator interconnecting a direct current supply circuit and a direct current load circuit, and which maintains the voltage impressed on the load circuit substantially constant within wide ranges of load current.

It is a still further object of my invention to provide a new and improved electronic voltage regulator interconnecting a direct current supply circuit and a direct current load circuit, and which maintains the voltage impressed on the load circuit substantially constant within wide ranges of input voltage.

It is another object of my invention to provide a new and improved precision electronic voltage regulator for controlling the voltage of a direct current load circuit, and which is capable of maintaining the voltage of the load circuit substantially constant under dynamic load conditions.

Briefly described, in the illustrated embodiment of my invention, I provide a new and improved electronic voltage regulator for impressing on a direct current load circuit a substantially constant unidirectional voltage. A source of unidirectional voltage having perceptible variations in value in response to load fluctuations is connected to a direct current load circuit through an electronic voltage regulator. A variable impedance or variable resistance electronic discharge device of the high vacuum type is connected between conductors of the same polarity of the direct current supply circuit and the direct current load circuit and controls the voltage of the load circuit. The electronic discharge device is of the controlled type having a control grid, the potential of which determines the current conducted; and a suitable impedance element, such as a resistance, is connected between one terminal of the direct current source and the grid for controlling the voltage impressed thereon. A second electronic discharge device of the controlled type, preferably of the high vacuum type, is connected in series relation with the resistance and transmits variable amounts of current therethrough to control the potential of the control grid. The potential of the cathode of the second electronic discharge device is maintained at a substantially constant potential above that of the negative conductor of the supply circuit or the load circuit by means of a voltage divider comprising a serially connected resistance and a glow discharge device which is connected across the load circuit. By connecting the glow discharge device to be responsive to the voltage of the load circuit, I utilize to the greatest advantage the substantially constant voltage characteristic of the glow discharge device.

For a better understanding of my invention, reference may be had to the following description, taken in connection with the accompanying drawing, and its scope will be pointed out in the appended claims. The single figure of the accompanying drawing diagrammatically illustrates an embodiment of my invention as applied to a system for controlling the voltage of a direct current load circuit energized from a direct current supply circuit.

Referring now to the single figure of the accompanying drawing, I have diagrammatically illustrated my invention as applied to an electronic voltage regulator for energizing a direct current load circuit, comprising conductors 1 and 2, from a direct current supply circuit 3. The direct current supply circuit 3 may be energized by any suitable translating apparatus, such as a biphase rectifier 4, which is energized from a suitable source of alternating current 5 through a transformer 6 and an electric valve means 7 having a pair of anodes 8 and 9 and a cathode 10. A filter circuit 11, comprising an inductance 12 and capacitances 13 and 14, may be connected between the rectifier 4 and the direct current supply circuit 3. Since the rectifier circuit 4 constitutes an appreciable impedance, the voltage of the direct current supply circuit 3 will vary appreciably with variations in the load transmitted by the system.

I provide an electronic voltage regulator 15 connected between the direct current load circuit and the direct current supply circuit. The electronic voltage regulator 15 comprises an electronic discharge device 16, preferably of the high vacuum type, having an anode 17, a cathode 18, a cathode heating element 19 and a control member or grid 20. The anode-cathode circuit of the electronic discharge device 16 is connected in series relation with conductors of corresponding polarity of the direct current load circuit and the direct current supply circuit. The cathode heating element 19 may be energized from a suitable source of current 21 and a voltage divider 22 may be connected across the circuit 21. Conductor 1 of the direct current load circuit may be connected to the voltage divider 22 by means of an adjustable contact or tap 23. Electronic discharge device 16 operates as a variable impedance device to control the voltage impressed on the direct current circuit including conductors 1 and 2.

A suitable impedance element, such as a resistance 24, is connected between the direct current supply circuit 3, such as the positive terminal thereof, to the control grid 20 of the electronic discharge device 16. I provide in series relation with the resistance 24 a second electronic discharge device 25, which is also preferably of the high vacuum type, having a pair of principal electrodes such as an anode 26, a cathode 27 and control means such as a pair of control grids 28 and 29. These grids are referred to as control grids for the purpose of indicating the function of these members. It is to be understood that one of the grids may be the conventional control grid and the other may be the conventional screen grid. A suppressor grid 30 may be employed and may be connected to the cathode 27. It is to be understood that the electronic discharge device 25 may be of the type having an anode, a cathode, and a single control means such as a single control grid. The electronic discharge device 25 conducts variable amounts of current through the resistance 24 to control the potential of the control grid 20 of discharge device 16.

In order to maintain the potential of one of the principal electrodes, such as cathode 27 of electronic discharge device 25, substantially constant, I employ a constant voltage device such as a glow discharge valve or device 31 which is an element of a voltage divider connected across the direct current load circuit. The glow discharge device 31 furnishes a substantially constant reference voltage due to its nonlinear-current impedance characteristic. A suitable impedance element, such as a resistance 32, is connected in series relation with the glow discharge valve 31 across conductors 1 and 2, and the common juncture 33 is connected to cathode 27. To assist the glow discharge valve 31 in maintaining a substantially constant reference voltage, I connect across the terminals thereof a capacitance 34.

I provide means such as a voltage divider connected across the direct current load circuit to impress on the control grid 28 a voltage which varies in accordance with the voltage of the direct current load circuit. This voltage divider may comprise serially connected resistances 35, 36 and 37. Resistance 36 may be provided with an adjustable intermediate tap 38 which is connected to the control grid 28 through resistance 39. Capacitance 40 may be connected between conductor 1 and control grid 28 to permit rapid changes in the signal transmitted to the control grid 28 from the direct current load circuit. In like manner, I provide means for impressing on the control grid 29 a voltage which varies in accordance with the voltage of the direct current load circuit and which may comprise a voltage divider connected across conductors 1 and 2, and which includes a resistance 41 having an adjustable intermediate tap 42. A capacitance 43 may be connected across a portion of the resistance 41 to provide a low impedance path for alternating current from grid 29 to conductor 2. The capacitance 43, acting in conjunction with the resistance 41, serves to by-pass high frequency variations in voltage which may be transmitted from the source of direct current, thereby stabilizing the potential of the control or screen grid 29.

The operation of the embodiment of my invention shown in the single figure of the drawing will be explained by considering the system when it is operating under variable load conditions. Due to the impedance of the rectifier circuit 4 and the filter circuit 11, under variable load conditions the voltage of the direct current supply circuit 3 will vary appreciably. The electronic regulator 15 operates to control the conductively of the electronic discharge device 16 so that the voltage impressed on the direct current load circuit remains substantially constant. The electronic discharge device 16 operates as a variable impedance or a variable resistance element to maintain the load voltage substantially constant. Variable amounts of unidirectional current are transmitted through the resistance 24 by the electronic discharge means 25 to control the potential of control grid 20 of discharge device 16. This unidirectional current flows through a circuit including the positive terminal of the direct current supply circuit 3, resistance 24, the anode-cathode circuit of the electronic discharge device 25, glow discharge device 31, and the negative terminal of the direct current supply circuit 3. The glow discharge device 31, the associated resistance 32 and resistances 35, 36 and 37 operate as a voltage responsive bridge to control the potential difference between the cathode 27 and the control grid 28 in response to the variations in voltage of the direct current load circuit. In like manner, the glow discharge device 31, the associated resistance 32 and the resistance 41 operate as a voltage responsive bridge to control the potential difference between cathode 27 and control grid 29 in accordance with the average voltage variations of the load circuit.

Due to the fact that the glow discharge device 31 is connected to be energized in accordance with the voltage of the direct current load circuit, the voltage reference provided thereby will be more nearly constant than if this device were connected across the direct current supply circuit 3. Of course, it is to be understood that although a glow discharge device offers a substantially constant reference voltage, it nevertheless constitutes a relatively low impedance, since the value of the voltage across its terminals varies as the current transmitted thereby varies. As an additional matter, it is to be noted that a portion of the unidirectional current which flows through device 31 is derived from the supply circuit 3 through the resistance 24 and the electronic discharge device 25. The current transmitted through resistance 32 and device 31 is substantially greater than the current through discharge device 25.

If it be assumed that the voltage of the direct current load circuit rises above the predetermined desired value, the potential difference between cathode 27 and control grid 28, and the potential difference between cathode 27 and the control grid 29 will increase, causing the electronic discharge device 25 to conduct a larger amount of unidirectional current and thereby lowering the potential impressed on the control grid 20 of discharge device 16. Accordingly, the electronic discharge device 16 will operate to effect a virtual increase in the voltage appearing thereacross and consequently restrict the voltage impressed on the direct current load circuit. Conversely, if the voltage of the direct current load circuit decreases below the desired value, the potential difference between cathode 27 and control grids 28 and 29 will decrease, causing the electronic discharge device 25 to conduct a smaller amount of current and thereby raising the potential impressed on control grid 20 of electronic discharge device 16. Consequently, the voltage appearing across the electronic discharge device 16 is decreased, causing the voltage impressed on the load circuit to increase.

I have found that by connecting the glow discharge device 31 to be responsive to the variations in the voltage of the load circuit instead of the supply circuit and by transmitting the current through the resistance 24 from the supply circuit through the electronic discharge device 25, that the regulation of the voltage impressed on the direct current load circuit is improved very materially. More specifically, I have found that the voltage regulation has been improved or reduced in the order of 50:1 over the performance of the prior art arrangements. As an example, by connecting the voltage divider including the glow discharge device 31 across the supply or input circuit for a given variation in load current, the voltage impressed on the load circuit was found to vary 0.5 volt, whereas with the volt-divider including the glow discharge device 31 connected in the manner shown in the figure, the voltage variation for the same fluctuation in load current was found to be only 0.01 volt which is a 50:1 improvement in voltage regulation.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, a variable resistance electronic discharge device having a control grid and connected between said circuits for controlling the voltage of said load circuit, an impedance element connected between said supply circuit and said grid, a second electronic discharge device connected in series relation with said impedance element for transmitting variable amounts of current therethrough to control the voltage impressed on said grid and comprising a pair of principal electrodes and a control grid for controlling the conductivity thereof, means for maintaining the potential of one of said principal electrodes substantially constant and comprising a serially connected impedance element and a glow discharge device connected across said load circuit, and means for impressing on said control grid of said second discharge device a voltage which varies in accordance with the voltage of said load circuit.

2. In combination, a supply circuit, a load circuit, a variable resistance electronic discharge device having a control grid and connected between said circuits for controlling the voltage of said load circuit, an impedance element connected between said supply circuit and said grid, a second electronic discharge device connected in series relation with said impedance element for transmitting variable amounts of current therethrough to control the voltage impressed on said grid and comprising a pair of principal electrodes, a control grid and a screen grid for controlling the conductivity thereof, means for maintaining the potential of one of said principal electrodes substantially constant and comprising a serially connected impedance element and a glow discharge device connected across said load circuit, means for impressing on said control grid of said second electronic discharge device a voltage which varies in accordance with the voltage of said load circuit, and means for impressing on said screen grid a voltage derived from said load circuit.

3. In combination, a supply circuit, a load circuit, a variable resistance electronic discharge device having a control grid and connected between said circuits for controlling the voltage of said load circuit, an impedance element connected between said supply circuit and said grid, and a second discharge device having a pair of principal electrodes and a pair of control grids for controlling the current conducted thereby, means for maintaining the potential of one of said principal electrodes substantially constant comprising a serially connected impedance element and a glow discharge device connected across said load circuit, means for impressing on one of said pair of control grids a voltage which varies in accordance with the voltage of said load circuit, and means for impressing on the other of said pair of control grids a voltage which varies in accordance with the voltage of said load circuit.

4. In combination, a supply circuit, a load circuit, a variable resistance electronic discharge device connected between said circuits for controlling the voltage of said load circuit and having a control grid, an impedance element connected between said supply circuit and said grid, a second electronic discharge device connected in series relation with said impedance element for transmitting variable amounts of current therethrough to control the voltage impressed on said grid, said second discharge device having an anode, a cathode and a control grid for controlling the current conducted thereby, a voltage divider comprising a serially connected impedance element and a glow discharge device connected across said load circuit, the common juncture of said second mentioned impedance element and said glow discharge device being connected to said cathode, and means for impressing on said grid of said second discharge device a voltage which varies in accordance with the voltage of said load circuit.

5. In combination, a supply circuit, a load circuit, a variable resistance electronic discharge device connected between said circuits for controlling the voltage of said load circuit and having a control grid, an impedance element connected between said supply circuit and said grid, a second electronic discharge device connected in series relation with said impedance element for transmitting variable amounts of current therethrough to control the voltage impressed on said grid, said second discharge device having an anode, a cathode, and a control grid for controlling the current conducted thereby, a voltage divider comprising a serially connected impedance element and a glow discharge device connected across said load circuit, the common juncture of said second mentioned impedance element and said glow discharge device being connected to said cathode, and a voltage divider connected across said load circuit for impressing on said grid of said second discharge means a voltage which varies in accordance with the voltage of said load circuit.

6. In combination, a supply circuit, a load circuit a variable resistance electronic discharge device connected between said circuits for controlling the voltage of said load circuit and having a control grid, an impedance element connected between said supply circuit and said grid, a second electronic discharge device connected in series relation with said impedance element for transmitting variable amounts of current therethrough to control the voltage impressed on said grid, said second discharge device having an anode, a cathode and a pair of control grids for controlling the current conducted thereby, means for impressing on one of said pair of control grids a voltage which varies in accordance with the voltage of said load circuit, means for impressing on the other of said pair of control grids a voltage which varies in accordance with the voltage of said load circuit, and means connected across said load circuit for maintaining the potential of said cathode substantially constant comprising a voltage divider including a glow discharge device.

7. In combination, a direct current supply circuit, a direct current load circuit, and voltage controlling apparatus comprising an electronic discharge device having an anode-cathode circuit connected between said circuits and having a grid to control the conductivity thereof, an impedance element connected between said supply circuit and said grid, a second electronic discharge device connected in series relation with said impedance element for transmitting variable amounts of current therethrough to control the voltage impressed on said grid, said second discharge device having a control grid and a voltage responsive bridge connected across said load circuit and comprising one branch circuit including an impedance element having an intermediate tap connected to the control grid of said second discharge device and a second branch circuit comprising a serially connected impedance element and a glow discharge device, the common juncture of said last mentioned impedance element and said glow discharge device being connected to the cathode of said second discharge device.

8. In combination, a supply circuit, a load circuit, a variable resistance electronic discharge device connected between said circuits for controlling the voltage of said load circuit and having a control grid, an impedance element connected between said supply circuit and said grid, a second electronic discharge device connected in series relation with said impedance element for transmitting variable amounts of current therethrough to control the voltage impressed on said grid and comprising a pair of principal electrodes, a control grid and a screen grid for controlling the conductivity thereof, means for maintaining the potential of one of said principal electrodes substantially constant and comprising a serially connected impedance element and a glow discharge device connected across said load circuit, means for impressing on said control grid of said second discharge device a voltage which varies in accordance with the voltage of said load circuit, and means for stabilizing the potential of said screen grid comprising a voltage divider connected across said load circuit and a capacitance connected across a portion of said voltage divider.

9. In combination, a supply circuit, a load circuit, a variable resistance electronic discharge device connected between said circuits for controlling the voltage of said load circuit and having a control grid, an impedance element connected between said supply circuit and said grid, a second electronic discharge device connected in series relation with said impedance element for transmitting variable amounts of current therethrough to control the voltage impressed on said grid and comprising a pair of principal electrodes and a control grid for controlling the conductivity thereof, means for maintaining the potential of one of said principal electrodes substantially constant and comprising a serially connected impedance element and a glow discharge device connected across said load circuit, means for impressing on said control grid of said second discharge device a voltage which varies in accordance with the voltage of said load circuit, and a capacitance connected between said control grid and one terminal of said load circuit to permit rapid changes in the potential of said control grid.

10. In combination, a supply circuit, a load circuit, a variable resistance electronic discharge device connected between said circuits for controlling the voltage of said load circuit and having a control grid, an impedance element connected between said supply circuit and said grid, a second electronic discharge device connected in series relation with said impedance element for transmitting variable amounts of current therethrough to control the voltage impressed on said grid and comprising a pair of principal electrodes, a control grid and a screen grid for controlling the conductivity thereof, means for maintaining the potential of one of said principal electrodes substantially constant and comprising a serially connected impedance element and a glow discharge device connected across said load circuit, means for impressing on said control grid of said second discharge device a voltage which varies in accordance with the voltage of said load circuit, a capacitance connected between one terminal of said load circuit and said control grid to permit rapid changes in potential thereof, and means for stabilizing the potential of said screen grid comprising a voltage divider connected across said load circuit and a capacitance connected across a portion of said voltage divider.

DONALD E. NORGAARD.